(No Model.)  7 Sheets—Sheet 1.

R. E. KIMBALL.
ADDING MACHINE.

No. 605,789.  Patented June 14, 1898.

Fig. 1

WITNESSES:
V. S. Ives.
Chas. N. Gray

INVENTOR
Robt E. Kimball
BY
Toulmin & Petterson
ATTORNEYS (No Model.)  7 Sheets—Sheet 3.

R. E. KIMBALL.
ADDING MACHINE.

No. 605,789.  Patented June 14, 1898.

Fig. 3

WITNESSES:
V. S. Ives.
Chas. N. Gray

INVENTOR
Robt E. Kimball
BY
Toulmin + Whitewood
ATTORNEYS.

(No Model.)  7 Sheets—Sheet 5.

R. E. KIMBALL.
ADDING MACHINE.

No. 605,789.  Patented June 14, 1898.

WITNESSES:  INVENTOR
  Robt E. Kimball
  BY
  Toulmin + Whittemore
  ATTORNEYS.

(No Model.) 7 Sheets—Sheet 6.

R. E. KIMBALL.
ADDING MACHINE.

No. 605,789. Patented June 14, 1898.

WITNESSES:
V. S. Ives
Chas. N. Gray

INVENTOR
Robt. E. Kimball
BY
Toulmin + Whittemore
ATTORNEYS.

THE NORRIS PETERS CO., PHOTO-LITHO., WASHINGTON, D. C.

(No Model.) 7 Sheets—Sheet 7.

R. E. KIMBALL.
ADDING MACHINE.

No. 605,789. Patented June 14, 1898.

WITNESSES:
V. S. Ives
Chas. N. Gray

INVENTOR
Robt. E. Kimball
BY
Toulmin & Whittemore
ATTORNEYS.

UNITED STATES PATENT OFFICE.

ROBERT E. KIMBALL, OF CLEVELAND, OHIO.

ADDING-MACHINE.

SPECIFICATION forming part of Letters Patent No. 605,789, dated June 14, 1898.

Application filed April 1, 1897. Serial No. 630,231. (No model.)

*To all whom it may concern:*

Be it known that I, ROBERT E. KIMBALL, a citizen of the United States, residing at Cleveland, in the county of Cuyahoga and State of Ohio, have invented certain new and useful Improvements in Adding-Machines, of which the following is a specification, reference being had therein to the accompanying drawings.

The invention relates to new and useful improvements in adding-machines, and embraces a number of objects, the first of which is to provide an organization in which there are a series of operating-keys, a series of numeral-pinions, and suitable intermediate devices arranged in such manner that upon initially operating any one of said keys the units-pinion will be actuated and upon subsequently operating any such key the tens-pinion will be rotated, and so on through the series.

Another object of my invention is to provide an organization in which there are a series of numeral-pinions, a traveling frame, and intermediate devices so arranged that as the frame is moved relatively to the pinions the intermediate devices will rotate such of the pinions as it is necessary to move in order to carry from one column to the next in the operation of adding.

There are also other objects in view, which relate to detail arrangements and constructions, as will be more fully hereinafter described, particularly pointed out in the claims, and shown in the accompanying drawings, in which—

The mechanism comprising the adding-machine, which is housed in a suitable casing, may be divided into three groups, as follows:

The first group comprises the keys, the actuating mechanism through which the keys, when depressed, operate the numeral-pinions, the stop mechanism, and the devices for returning the carriage. The second group embraces the carrying mechanism and the means for returning the pinion-actuating device to its initial position, and the third group comprises the mechanism that is employed to return all the numeral-pinions to zero after a column of figures has been added, thereby placing the machine in condition for further operation.

Figure 1:
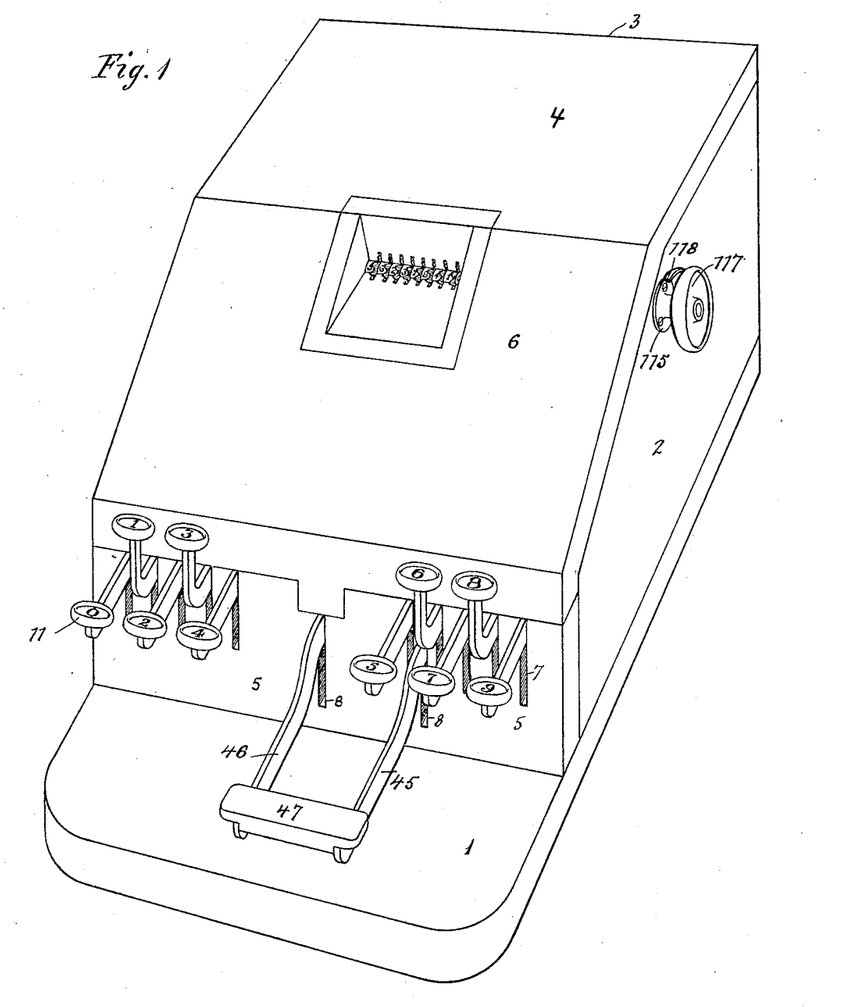
Figure 1 is a perspective view of the finished machine.

The inclosing casing that I preferably employ consists of a base-plate 1, sides 2, rear or back plate 3, top 4, an upright front portion 5, and the inclined face 6, all as plainly shown in Fig. 1. The plate 5 is provided with two groups of vertical slots 7, arranged midway between its upper and lower edges and at each end of the plate, through which slots a series of keys are adapted to extend.

The plate is further provided with two similar slots 8 in proximity to the center, through which slots the carrying-key extends. The casing thus described is provided with an inspection-opening, through which the numeral-pinions may be seen, and is adapted not only to form a protection for the different parts of the machine, but comprises a supporting-frame in which different parts of the mechanism have bearings.

The first group of devices which form a part of the machine mechanism will be now described.

Figure 2:
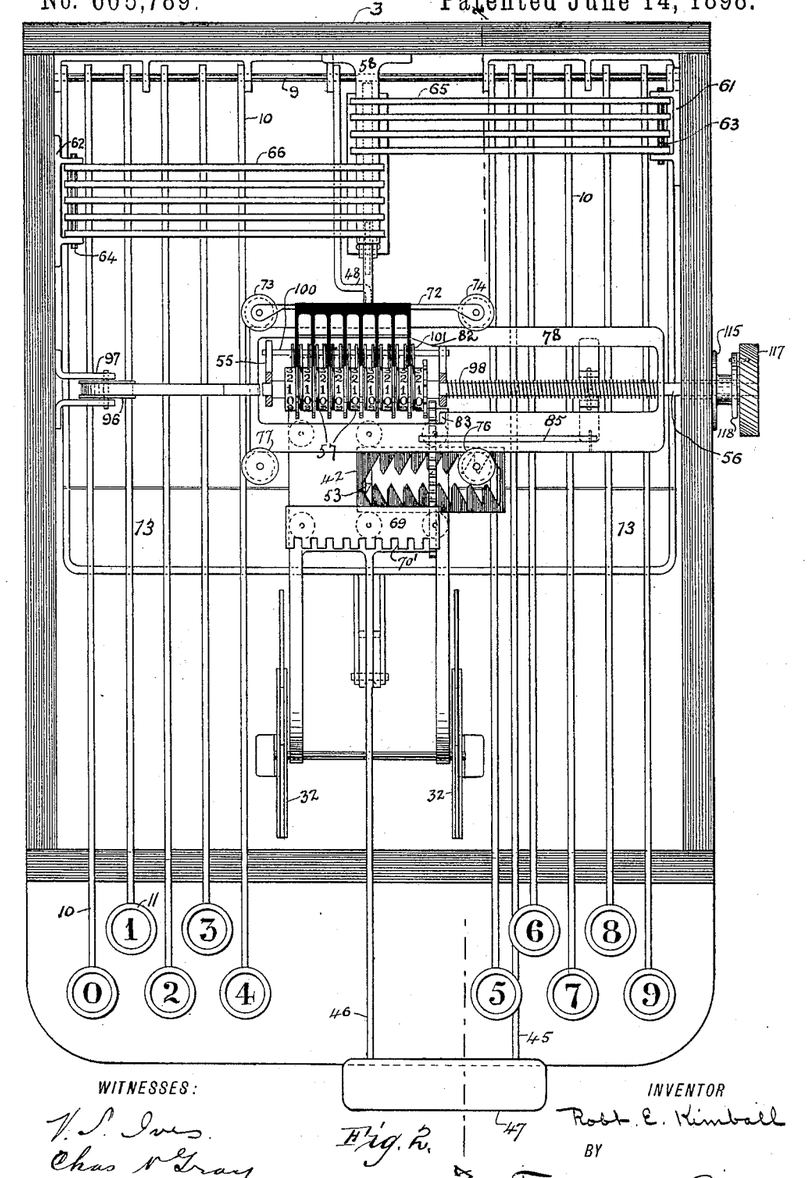
Fig. 2 is a plan view with the cover and certain supporting-bearings removed, together with some parts of the mechanism, to show the manner in which the carriage and pinion-operating devices thereon actuate the numeral-pinions.
Figure 3:
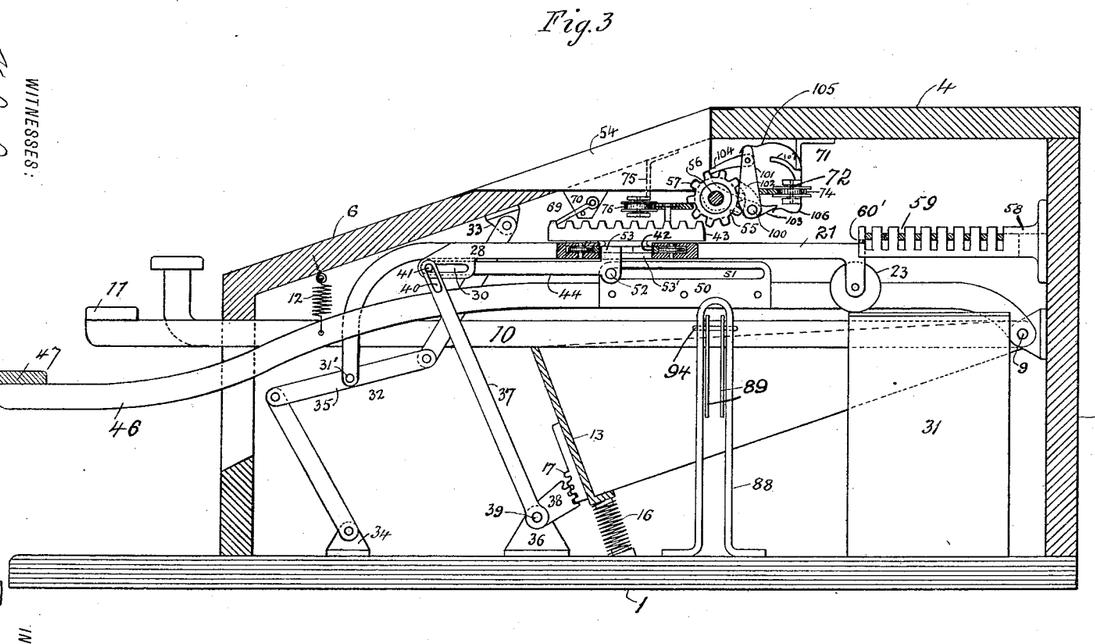
Fig. 3 is a section taken on line $xx$, Fig. 2.
Figure 4:
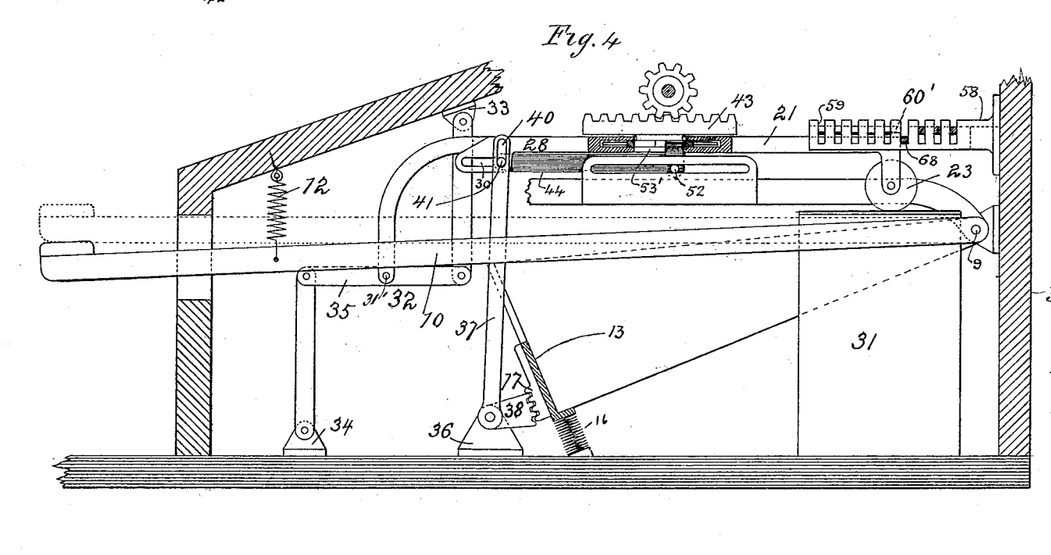
Fig. 4 is a view similar to Fig. 3, the top portion of which has been broken away, showing the pinion-actuating devices in a different position.

A shaft 9, Figs. 2, 3, and 4, is fixedly secured in the rear of the casing in suitable supports secured to the plate 3, and upon this shaft are fulcrumed a series of horizontal lever-arms 10, extending from the rear of said casing to and through the front thereof and carry upon their free ends disks 11. Upon these disks are printed or stamped numerals ranging from "0" to "9." These lever-arms, or, as they will be hereinafter termed, "keys," have their free ends alternately straight and bent up, as plainly shown in Fig. 1, in order that the operator will experience no difficulty in manipulating the same. In arrangement the keys are preferably grouped in two banks, and from the inclined plate 6 of the casing a series of spiral springs 12 depend, the free ends of said springs being connected, respectively, to each of the keys, whereby the latter are held in their proper position.

Figure 15:
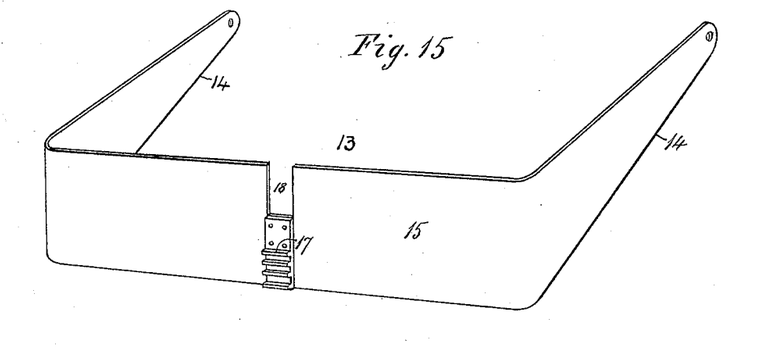
Fig. 15 is a detail perspective view of the yoke-shaped lever which drives the carriage.

Beneath the keys within the casing is located a yoke-shaped lever 13, the free ends of which are fulcrumed upon the shaft 9. In construction this lever comprises two tapering arms 14, Fig. 15, which extend from the rear of the machine forwardly at some distance past the center and are connected by a broad cross-piece 15, extending transversely of the machine and held in its upright position beneath the keys and in contact therewith by means of springs 16, Fig. 4.

Upon the cross-piece of the lever just described and at the center thereof is arranged a series of gear-teeth 17, and above said teeth the lever is provided with a rectangular recess or notch 18 upon its upper edge.

The longitudinally-reciprocating carriage that is adapted to carry the pinion-operating devices (shown in perspective in Fig. 16) comprises a rectangular body 20, provided with an arm 21, projecting centrally and forwardly from said body portion, which arm in turn is provided at its free end with downwardly-extending lugs 22, between which a roller 23 is pivoted. Transversely in the body of the carriage is a deep rectangular recess 24, and in each of the faces of said recess are guideways 25, in which are pivotally secured rollers 26. From the rear of the carriage project three arms, one from each side, such as 27, and a third 28, extending centrally from said carriage, carrying at its free end and on either side thereof lugs 29, which project below the arm and are provided with longitudinal slots 30. The arms 27 are curved downwardly at their outer ends and are adapted to carry a bar 31', fixedly secured therein. The carriage thus described is supported at its forward end upon an upright standard 31, secured to the base-plate of the casing, as shown in Figs. 3 and 4, upon which standard a roller 23 is adapted to travel. The rear of the carriage is suspended by means of two sets of links 32, each set comprising a series of three links, the free ends of which are pivoted, respectively, to angle-plates 33 upon the face 6 of the casing and similar angle-plates 34 upon the bottom of said casing. The middle link 35 of each series is perforated at its center to receive the end of the bar 31'. By employing the ordinary straight-line links for the rear of the machine, the carriage is suspended at the rear in the same plane with the top of the supporting-standard and will remain in the same plane during its forward and backward movements.

Figures 16, 17:
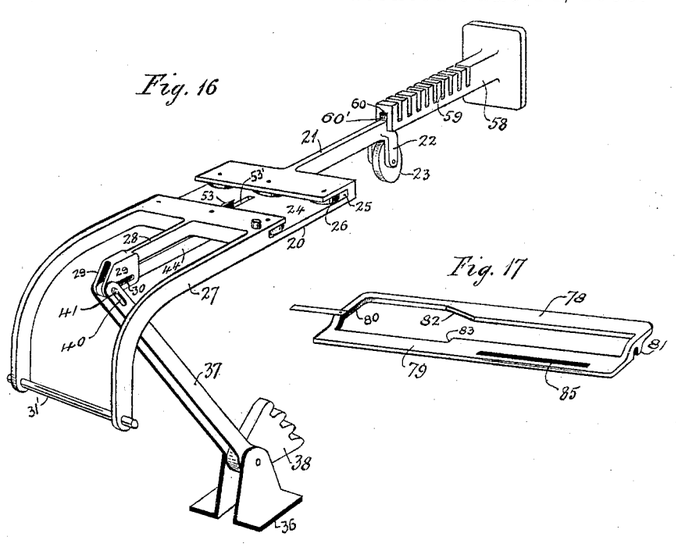
Fig. 16 is a perspective view of the carriage, a part of its driving mechanism, and the stop-bar support.
Fig. 17 is a perspective view of the carrying-frame, illustrating the peculiar construction of the same.

Upon the bottom of the casing are two angle-plates 36, Fig. 16, between which plates is pivoted a double lever-arm 37, and within the double lever and fixedly secured thereto between the angle-plates is a segment-gear 38. The plates 36 are in close proximity to the base of the yoke-shaped lever 13 to permit the segment-gear 38 to be constantly in mesh with the gear-teeth 17 upon the yoke. The free ends of the lever 37 are slotted, as at 40, and are arranged upon either side of the slotted arm 28 of the carriage. A pin 41, carried by an escapement-key hereinafter described, passes through the slotted ends of the arms just described.

Figure 5:
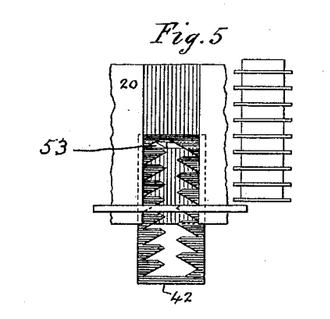
Figs. 5, 6, and 7 are detail plan views of the pinion-operating rack and the escapement for feeding the rack laterally, showing the parts at the commencement and end of one operation.
Figure 6:
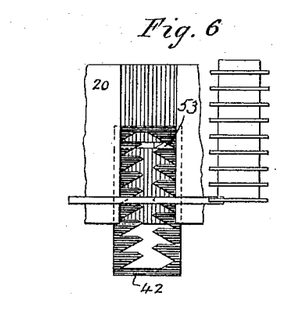
Figure 7:
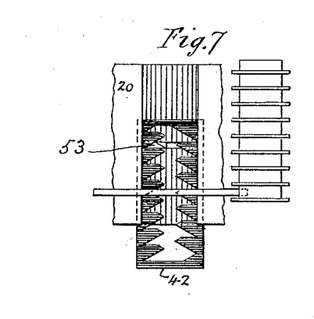

In the recessed portion of the carriage-body 24, sliding in the guideways 25, is located an escapement 42, consisting of a rectangular metallic plate having a series of teeth formed therein, as plainly shown in Figs. 5, 6, and 7, and arranged in such manner that the teeth on one side of the escapement will be opposite the space formed on the other side. Upon the top of the escapement is mounted and fixedly attached thereto a rack-bar 43. Beneath the carriage-arm 28 and secured to the pin 41 is an escapement-key, the free end of which key is formed and supported in the manner hereinafter described.

Figure 18:
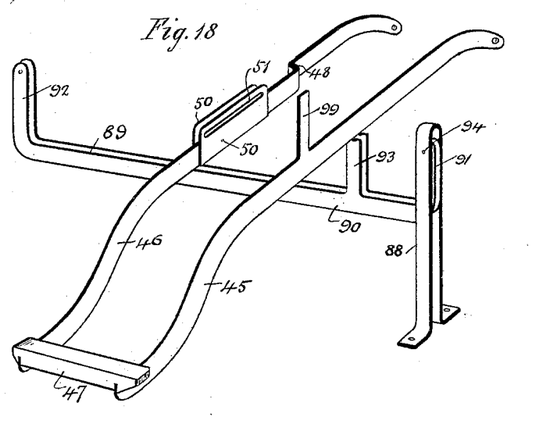
Fig. 18 shows the carrying-key and the frame-lever in perspective, the parts being arranged as in operation.

Upon the shaft 9 are pivotally supported lever-arms 45 and 46, Figs. 2 and 18, which levers project out from the front of the casing and are connected at their free ends by a cross-bar 47. The lever 46 is bent at 48 in such manner as to allow the lever to pass beneath the central portion of the carriage and also beneath the arm 28 thereon. Upon each side of this lever, beneath a portion of the escapement, are secured side plates 50, provided with longitudinal slots 51, which slots are in alinement. Within the slots just referred to a pin 52 extends, Fig. 4, and to this pin the free end of the escapement-key is fixedly secured. The key is also provided at its end with an upwardly-projecting stud 53, which extends through a slot 53' in the body of the carriage and projects within the escapement in close proximity to the top of the latter. This stud in configuration is triangular, as plainly shown in Fig. 5, and is adapted to fit closely in the spaces between the teeth.

Depending from the interior of the inclined face 6 of the casing and upon each side of the inspection-opening are two bracket-plates 54, Fig. 3, and integral with these bracket-plates are extension-pieces 55. (Shown in dotted lines in the same figure.) Journaled in bearings upon these extension-pieces is a transverse shaft 56, which shaft extends to the right of the machine and through and out of the side of the casing, as plainly shown in Fig. 2. Loosely sleeved upon this shaft above the carriage are a series of numeral-pinions 57, preferably nine in number, the position of the parts being such that the rack-bar upon the carriage will be capable of passing beneath and meshing with said pinions at proper periods.

Upon the rear of the casing, directly in front of the forwardly-projecting arm 21 on the carriage, is secured a projecting arm 58, Figs. 3 and 16. In construction this arm is provided with a series of transverse slots 59, and its under face is provided with a single longitudinal slot 60, in which a lug 60' upon the arm 21 of the carriage is adapted to travel.

Figure 8:
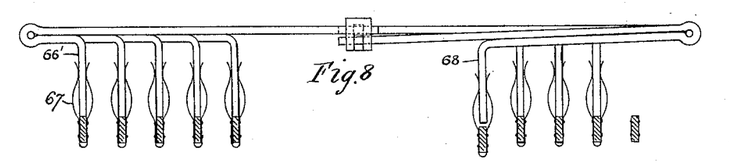
Fig. 8 is a detail view of the stop mechanism which limits the travel of the carriage.

Fixedly secured in bearings 61 and 62, Fig. 2, upon the sides of the casing and at the rear thereof are shafts 63 and 64. Pivotally supported upon the shaft 63 are a series of stop-bars 65, preferably four in number, extending inwardly from said shaft, the free ends of which rest within a portion of the transverse slots in the projecting arm 58. The second series of stop-bars 66 are secured in a similar manner to the shaft 64 and are adapted to rest within the remaining slots in the arm mentioned. Each bar is formed, preferably, of a single strip of metal, rectangular in configuration, extending from the slot in the arm 58 to and around the shaft upon which it is pivotally supported and is bent back upon itself a short distance, as shown in Fig. 8, and then downwardly at right angles to the main bar. The projecting finger 66' last described is adapted to come directly over and in contact with the key-lever to which it belongs and is adapted to follow the key when depressed by spring-clips 67, which bear upon either side of the projections, as plainly shown in the figure just referred to.

The actuating devices comprising the first group of the adding mechanism have now been mentioned, and the first step in the operation of adding will be described.

The operator, desiring to add a column of figures, commences in the first line of said column with the unit-figure and depresses the key that corresponds to that particular figure. Before operation of any of the parts the devices are in the position as shown in Fig. 3. Upon depression of the key the parts are in the position shown in Fig. 4. Upon the partial depression of any one of the keys the yoke-shaped lever 13 is slightly depressed. The teeth upon this latter lever mesh with the segment-gear 38, throwing the arm 37 forward, thereby causing the escapement-key 44 to traverse the slots 30 and 53'. The position of the key before its movement is shown in Fig. 5, the rack being out of mesh with the units-pinion in the series of numeral-pinions and at one side thereof. The escapement-key traveling within the escapement from one side to another causes the latter to move laterally to the left a distance of one-half a tooth. This is sufficient to throw the rack in mesh with the units-pinion, and the parts are then in the position shown in Fig. 6. Simultaneously with the depression of the key its stop-bar is drawn down into its respective slot. We will suppose that the operating-key 5 has been depressed, Fig. 4. In this case its stop-bar, which is the fifth bar upon the projecting arm 58, counting from zero, would be drawn into the fifth slot. Upon further depression of the key 5 the pin 41, having traversed the slot 30, will be forced by the arms 37 forwardly, thereby driving the carriage along until the arm 21 thereon is checked by the stop just referred to. During this forward movement of the carriage the units-pinion has been rotated by the rack five teeth and the numeral "5" appears upon the units-pinion in place of the "0." Upon the upward movement of the key 5 the lever 13 is forced upward by the spring 16, throwing the arm 37 rearwardly, whereby the escapement-key is forced into the position shown in Fig. 7, and the escapement and rack are moved laterally, throwing the rack out of mesh with the units-pinion into the position shown in the figure just referred to. Upon the completion of the upward movement of the key the carriage is drawn back by the arm 37 and the stop-bar elevated out of the path of the forward arm of the carriage by the key abutting against the downwardly-extending projection upon said bar, said key being returned to its initial position by means of the spiral springs connecting the same with the inclosing casing. The first step in the process of adding has been taken and the rack is located between the units and tens pinions, but out of mesh with either. Upon depressing another key corresponding to the next number in the line of figures to be added the same operation is performed, with the exception that the rack operates the tens-pinion instead of the units, turning said pinion a number of teeth to correspond with the number upon the key depressed. This operation continues until a line of figures is shown upon the series of numeral-pinions. In case the carriage carrying the operating-rack be driven forward before the rack is in mesh with the numeral-pinions I employ a safety device which will only permit the carriage to be driven forward at the proper time. This appliance consists of a rectangular plate 69, Figs. 2 and 3, pivotally suspended from lugs 70 upon the bracket-plate 54, which swinging plate is provided with a series of teeth 70' upon its lower edge. The teeth just referred to are so arranged as to block the last tooth upon the rack-bar at all times, except when said rack is in mesh with the pinion-teeth.

A new group of operating devices is now required in order to return the rack to its initial position and to carry the amount left over from one column to another, which mechanism will be now described.

Figure 9:
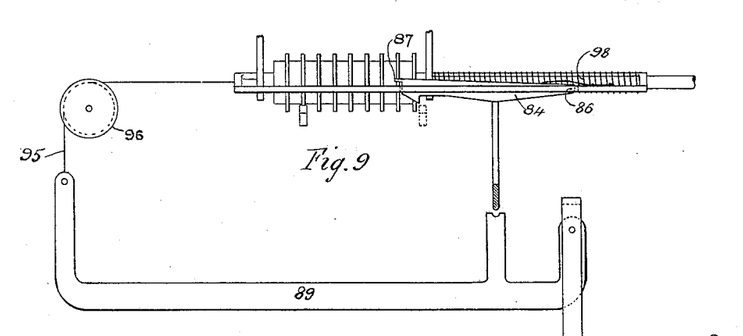
Figs. 9 and 10 are detail views of the carrying-frame which surrounds the numeral-pinions, showing said frame in its initial position and in the position after operation and further illustrating the latching device thereon, which returns the rack to the units-column.
Figure 10:
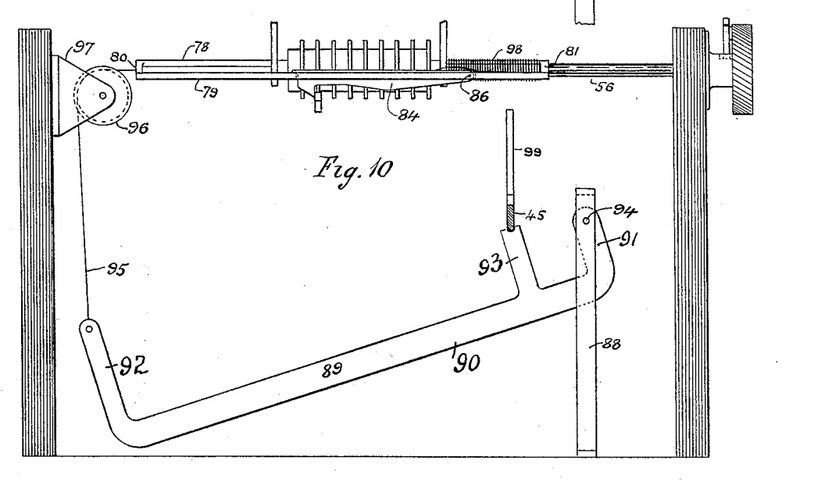

Depending from the plate 4 of the casing are two angle-plates 71, one of which plates is shown in Fig. 3, said plates being in alinement and arranged at the rear of the numeral-pinions. To these plates is secured a cross-bar 72, Fig. 2, having bifurcated ends extending beyond the plates and adapted to carry pivotally secured within said bifurcations two rollers 73 and 74. From the inclined face 6 of the casing depend similar angle-plates 75, which are arranged in a manner similar to the plates 71, but forwardly of the numeral-pinions. These plates carry a cross-bar similar in construction to the bar 72, in the ends of which are pivoted rollers 76 and 77. The four rollers thus referred to are flanged and are arranged in different planes, the bar carrying the rolls located forwardly of the numeral-pinions being in a lower plane than its corresponding bar. Between these rolls just described a frame, which will be designated hereinafter as a "carrying-frame," is mounted and adapted to travel. In construction this frame is rectangular in configuration, comprising two side bars 78 and 79, Fig. 17, secured to each other at some distance apart by end pieces 80 and 81. In order that the frame may travel within the rolls, which are arranged in pairs at different levels, the end pieces of the frame are bent at their middle portions, as shown in the figures referred to, whereby the side 79 is in a lower plane than the side 78, but parallel to the latter. The end piece 81 is centrally grooved upon its under face, in which groove the shaft 56 is adapted to pass. Upon the inner side 78 of the carriage an inclined face 82 is formed, and opposite to this inclined face, upon the side 79, a shoulder 83 is constructed. A longitudinal slot 85, Fig. 17, is formed in the side 79, in which slot a latch 84, Figs. 9 and 10, is pivoted by a pin 86.

87 is an extension upon the latch adapted to strike against the top of the frame, whereby the downward movement of the latch is restricted.

Beneath the carrying-frame thus described, to the right of the numeral-pinions and secured to the bottom of the casing, is a U-shaped standard 88, in which standard, near the top thereof, is pivotally secured the frame-operating lever 89, the parts being shown plainly in Figs. 3 and 18. This lever is preferably a double lever in construction, comprising arms 90, provided at their free ends with the curved upwardly-extending fingers 91 and 92 and between said fingers with similar projections 93. The lever is pivoted at one end within the standard 88 by a pin 94, and to the free ends of this lever is secured a steel ribbon 95, Figs. 9 and 10, extending upwardly over a sheave 96, mounted between angle-plates 97 upon the side of the casing. The free end of this ribbon is secured to the end of the carrying-frame, as plainly shown in the figures just referred to.

The carrying-lever just described is so located that the upwardly-projecting fingers 93 thereon are directly under and in contact with the lever-arm 45, which lever-arm, together with the corresponding lever 46, comprises what will be termed hereinafter the "carrying-key." The arrangement is such that when this key is depressed the carrying-lever is likewise depressed, thereby causing the carrying-frame to travel between the rolls. To retain the latter frame in its proper location, a spiral spring 98 is interposed between one end thereof, to the right of the numeral-pinions, and the bearing in which the shaft 56 is journaled, said spring being sleeved over the latter shaft. Upon the bar 45 of the key-lever is an upright finger 99, which in its normal position bears against the under side of the latch 84, Fig. 9.

Figure 11:
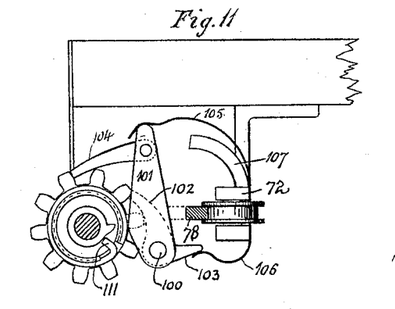
Fig. 11 is a detail view of one of the numeral-pinions with its carrying pawl-lever and pawl attached thereto, the parts being shown in their normal position.

In the extensions 55 of the bracket-plates 54 and rearwardly of the numeral-pinions is fixedly secured a transverse shaft 100, and loosely sleeved upon this shaft at the rear of each numeral-pinion are a series of carrying pawl-levers 101. These levers are preferably double levers, comprising two arms spaced at some distance apart and having pivoted between them upon the shaft a check-pawl 102, provided with an extension 103 and carrying between their upper ends the carrying-pawl 104. A series of springs 105 are secured to the cross-bar 72, which extend upwardly over the top of the bar and bear normally against the top of the carrying pawl-lever when the parts are in the position shown in Fig. 11. A similar series of springs 106 is secured to and extend beneath the bar 72 and, projecting upwardly, bear against the extensions 103 upon the check-pawls.

107 represents a series of curved projecting fingers, against which the pawl-levers 101 are adapted to rest when thrown back for carrying.

Figure 12:
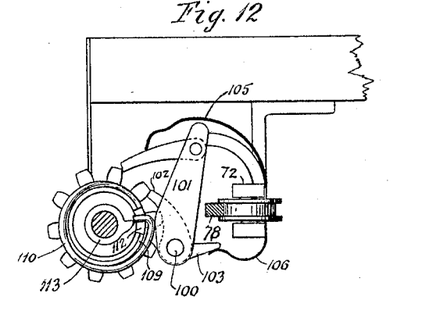
Fig. 12 is a similar view showing the carrying-lever and its pawl in the act of falling into its second position.

The numeral-pinions are somewhat similar to the usual pinions employed in devices of this kind, comprising the usual gear-teeth and being provided with numerals ranging from "0" to "9" upon the periphery of the pinion adjacent to the teeth. In the particular construction of the pinion I prefer to employ the face opposite to the gear-teeth is provided with an annular flange 108, and upon the exterior and near the top of this flange is an annular groove 109. In this groove a spring 110 is inserted, which carries an inwardly-projecting extension-piece 111, the extension being located within a recess 112. Fixedly secured to the transverse shaft 56 is a series of cams 113, corresponding in number to the numeral-pinions, arranged in close proximity to said pinions within the annular flange, as plainly shown in Fig. 13. The arrangement is such that when the numeral-pinion is rotated more than nine teeth the cam will throw out the spring extension 111, which in turn will throw back the carrying pawl-lever with which it is in contact a sufficient distance to permit the carrying-pawl to drop back one tooth, as shown in Fig. 12.

The parts comprising the second group of the actuating mechanism have now been described, and their operation is as follows: At the close of the first operation the rack had been carried laterally until it was at some distance to the left of the unit-pinion and the first line of figures in the column were shown upon the series of pinions. Upon the partial depression of the carrying-key the escapement-key 44, one end of which slides in the slotted plates 50 within the carrying-key, is withdrawn from the escapement. Also the upwardly-projecting finger 99 is withdrawn from the latch, allowing the latter to drop until it is stopped by the extension 87 striking upon the carrying-frame. Upon further depression of the carrying-key the lever 90 is depressed, thereby drawing the carrying-frame laterally across the machine within the rolls in which it is suspended. One side of the frame being located directly above the rack and in close proximity to the same, the latch extending beneath said frame slides over the rack when the frame moves to the left. Upon the upward movement of the carrying-key the spring 98 returns the carrying-frame to its initial position, and the latch upon the return movement of the carriage will engage the rack and draw the same, together with the escapement, back to its first position ready for adding a new line of figures. When the carrying-key returns to its initial position, the escapement-key is returned within the escapement and the latch is raised out of engagement with the rack by the extension 99. The operator then proceeds to depress the proper key for the second line of figures. If the first figure that is to be struck in the second line is "6" and the unit-pinion is registering "5," the rack when driven forward by the mechanism before described will turn the unit-pinion to "1," which is the correct reading for the same. During the rotation of the unit-pinion from its original position at "5" around to "1" the spring extension 111 is thrown out by the cam 113, thereby throwing back the carrying-pawl lever 101. The same operation is gone through with during the rest of the line of figures until the last figure has been depressed and it is desired to return the rack to its initial position adjacent but out of mesh with the unit-pinion. The second step that has just been described—namely, the reciprocating of the frame—is then taken. During the travel of the frame to the left in the first half of its reciprocating movement the inclined face 82 thereon strikes against each carrying-pawl lever, which has been thrown rearwardly out of its initial position by the cam mechanism and moves each lever back into its initial position. During this latter movement of the levers each adding-pinion with which the lever is adapted to engage is rotated one additional tooth, whereby the desired amount is carried and the proper reading is obtained upon the pinions.

In order to prevent the carrying-pawls from rotating the adding-pinion too far, the shoulder 83 of the carrying-frame is adapted to come in contact with the teeth upon the pinions upon the opposite sides from where the carrying-pawl actuates the same before the pawl drives the pinion its entire distance. This construction and arrangement of frame are plainly shown in Fig. 3.

Figures 13, 14:
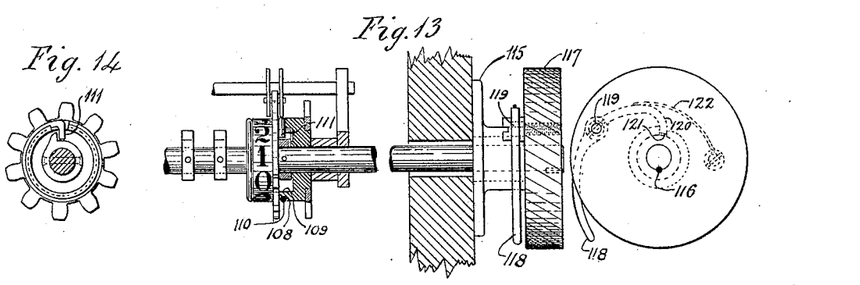
Fig. 13 is a detail view of two numeral-pinions, showing one in elevation and the other in section and illustrating the mechanism which returns the pinions to zero.
Fig. 14 is an end view of one of the numeral-pinions.

The last step in the operation of the device is to return all the adding-pinions to their initial position—namely, at zero—for future operation. This I accomplish in the following manner:

Upon the right-hand side of the inclosing casing is fixedly secured a boss 115, Figs. 2 and 13, centrally apertured to admit the passage therethrough of the shaft 56. Upon the free end of this shaft in proximity to the boss is fixedly secured by means of a key 116 a thumb-wheel 117. Arranged upon the thumb-wheel between the latter and the boss is a thumb-lever 118. This lever is pivoted to the thumb-wheel at 119, and the free end of this lever is provided with a curved downwardly-projecting finger 120, the end of which is adapted to enter a recess 121 in the boss and to be kept therein in its normal position by a spring 122. After a column of figures has been added upon the machine and it is desired to place the said machine in condition for adding a new column the operator depresses the thumb-lever 118, withdrawing the free end of said lever from the aperture 121 in the boss. Then by rotating the thumb-wheel 117 one complete revolution the cams 113, that are fixedly secured to the shaft, engage the numeral-pinions and carry the same back to zero. The thumb-lever is then released, returning to its normal position, and the machine is ready for further operation.

It is to be noticed in the construction of the adding-machine thus described that there are but very few sliding parts in the same. Furthermore, the different elements which form the complete mechanism are so constructed and arranged that but little exertion is necessary on the part of the operator to actuate the same. Thus a machine is formed which is capable of easy operation and which will at all times add quickly and correctly.

It is to be further noticed that in the construction of the mechanism for returning the numeral-pinions to zero after the process of adding has been completed I have provided means for returning said pinions to their initial position without having the pinion-actuating device in any manner act upon the carrying-levers that are arranged in proximity to the pinions. Also by employing a reciprocating carriage for rotating the numeral-pinions I am enabled to use an exceedingly simple stop mechanism, which effectively performs its function and which may be cheaply and easily manufactured.

Having thus described my invention, what I claim, and desire to secure by Letters Patent, is—

1. In an adding-machine, the combination with a series of operating-keys, of a carriage mounted for reciprocation, intermediate connections between the keys and carriage, whereby the latter is moved forwardly upon the depression of any of the keys, spring-actuated mechanism for automatically returning the carriage to its initial position, a series of numeral-pinions arranged upon the shaft for independent rotation, a pinion-actuating device mounted upon the carriage, and an intermittent lateral feed for said device, adapted to throw the latter in engagement with one of the pinions before the forward movement of the carriage, and out of engagement with the pinion upon the return movement of the carriage.

2. In an adding-machine, the combination with a series of operating-keys, of a carriage mounted for reciprocation, intermediate connections between the keys and carriage, whereby the latter is moved forwardly upon the depression of any of the keys, spring-actuated mechanism for automatically returning the carriage to its initial position, a series of numeral-pinions arranged upon a shaft for independent rotation, a pinion-actuating device mounted upon the carriage, and an intermittent lateral feed for said device, adapted to throw the latter in engagement with one of the pinions before the forward movement of the carriage, and between said pinion and the next successive pinion before the return movement of the carriage.

3. In an adding-machine, the combination with a series of operating-keys, of a longitudinally-reciprocating carriage, a series of numeral-pinions arranged for independent rotation, a carriage-driving mechanism connecting the keys with the carriage, and adapted upon depression of any one of said keys to drive the carriage forward beneath the series of pinions to rotate one of the latter, spring-actuated mechanism for automatically returning the carriage to its initial position, a pinion-operating device upon the carriage, and lateral shifting mechanism for said device.

4. In an adding-machine, the combination with a series of operating-keys, of a carriage mounted for horizontal reciprocation, intermediate connections between the keys and carriage, whereby the latter is moved forwardly upon the depression of any of the keys, spring-actuated mechanism for automatically returning the carriage to its initial position, a series of numeral-pinions arranged upon a shaft for independent rotation, a rack upon the carriage adapted to engage with and rotate one of the pinions during the forward movement of said carriage, and lateral intermittent feed mechanism for moving the rack out of engagement with one pinion and in engagement with its next successive pinion, comprising an escapement 42 upon which the rack is secured, an escapement-key 44, and intermediate connections between the operating-keys and said escapement-key, and between the carriage-returning mechanism and the escapement-key, whereby the escapement is given an intermittent lateral movement.

5. In an adding-machine, the combination with a pinion-operating carriage mounted for horizontal reciprocation, and the driving mechanism for moving said carriage forwardly, comprising a series of operating-keys, lever 13, arm 37, a gear connection between the arm and lever, carriage-arm 28, and pin 41, substantially as described.

6. In an adding-machine, the combination with a pinion-operating carriage mounted for horizontal reciprocation, and the mechanism for reciprocating said carriage, comprising a series of operating-keys, a spring-actuated toothed lever 13, lever-arm 37, segment-gear 38, carriage-arm 28, and connecting-pin 41, substantially as described.

7. In an adding-machine, the combination with a carriage mounted for horizontal reciprocation, of a series of numeral-pinions sleeved upon a shaft for independent rotation, a pinion-operating rack mounted upon the carriage, and mechanism for feeding said rack laterally, and for operating the pinions successively comprising a series of operating-keys, the spring-actuated lever 13, lever-arm 37, a gear connection between levers 13 and 37, the slotted carriage-arm 28, an escapement-key slidingly supported beneath the escapement, carrying a pin 41 engaging the lever 37 and arm 28 and a stud 53 upon the key extending within said escapement, substantially as described.

8. In an adding-machine, the combination with a series of operating-keys, of a carriage mounted for reciprocation, intermediate connections between the keys and carriage whereby the latter is moved forwardly upon the depression of any of the keys, a series of numeral-pinions arranged upon a shaft for independent rotation, a pinion-actuating device upon the carriage adapted to engage with and rotate one of the pinions during the forward movement of the carriage, a stop mechanism adapted to limit the travel of the carriage, and the rotation of the pinion, and spring-actuated mechanism for moving the pinion-actuating device out of engagement with the pinion, and returning the carriage to its initial position.

9. In an adding-machine, the combination with a series of operating-keys, of a carriage mounted for reciprocation, intermediate connections between the keys and carriage, whereby the latter is moved forwardly upon the depression of any of the keys, a series of numeral-pinions arranged upon a shaft for independent rotation, a pinion-actuating device upon the carriage adapted to engage with and rotate one of the pinions during the forward movement of said carriage, and stop mechanism for limiting the travel of said carriage and the rotation of the pinion, comprising a single series of stop-bars having intermediate connections with the keys, whereby, upon the depression of any key, its corresponding stop-bar will be thrown in the path of the advancing carriage.

10. In an adding-machine, the combination with a series of operating-keys, of a carriage mounted for reciprocation, intermediate connections between the keys and carriage, whereby the latter is moved forwardly upon the depression of any of the keys, a series of numeral-pinions arranged upon a shaft for independent rotation, a pinion-actuating device upon the carriage, adapted to engage with and rotate one of the pinions during the forward movement of the carriage, and stop mechanism for limiting the travel of said carriage, and the rotation of the pinion, comprising a series of bars resting normally upon the keys, substantially as described.

11. In an adding-machine, the combination with a series of operating-keys, of a carriage mounted for reciprocation, intermediate connections between the keys and carriage whereby the latter is moved forwardly upon the depression of any of the keys, a series of numeral-pinions arranged upon a shaft for independent rotation, a pinion-actuating device upon the carriage, adapted to engage with and rotate one of the pinions during the forward movement of the carriage, and a stop mechanism for limiting the travel of the carriage, and the rotation of the pinion, comprising a series of bars resting normally upon the keys, and a series of spring-clips connecting each bar with its key, whereby, upon the depression of the latter, the bar will be drawn downwardly in the path of the carriage.

12. In an adding-machine, the combination with a series of operating-keys, of a carriage mounted for reciprocation, intermediate connections between the keys and carriage whereby the latter is moved forward upon the depression of any of the keys, a series of numeral-pinions arranged upon a shaft for independent rotation, a pinion-actuating device upon the carriage adapted to engage with and rotate one of the pinions during the forward movement of said carriage, and a stop mechanism for limiting the travel of the carriage and the rotation of the pinion, comprising a series of bars, provided with depending fingers, adapted to rest upon the keys, and a projecting arm 58, said arm being provided with a longitudinal slot, in which a portion of the carriage is adapted to travel, and with a series of transverse slots in which the bars are drawn upon the depression of the keys, substantially as described.

13. In an adding-machine, the combination with a reciprocating carriage, a series of numeral-pinions, a rack and a lateral feed therefor mounted upon the carriage, actuating mechanism for operating said carriage and feed, a carrying-key, a rack-returning device having intermediate connections with the key, whereby the said device is moved in one direction upon the depression of the key, and means for automatically returning the device and rack to their initial positions upon the releasement of the key.

14. In an adding-machine, the combination with a reciprocating carriage, a series of pinions, a rack and a lateral feed therefor mounted upon the carriage, actuating mechanism for operating the carriage and feed, a carrying-key, a rack-returning frame having intermediate connections with the key whereby, upon the depression of the latter, the frame is moved in one direction, and means for automatically returning the frame and rack to their initial positions upon the releasement of the key.

15. In an adding-machine, the combination with the carriage, the numeral-pinions, a rack, and a lateral feed therefor, arranged upon the carriage, actuating mechanism for operating the carriage and feed, and means for returning the rack, after its lateral travel, to its initial position, comprising a carrying-key, a frame mounted for reciprocation, a latch upon said frame, intermediate connections between the frame and key, whereby, upon the depression of the latter, the frame is moved in one direction, and a spring for automatically returning the frame and rack to their initial positions upon the releasement of the key.

16. In an adding-machine, the combination with the carriage, the numeral-pinions, a rack, and a lateral feed therefor, arranged upon the carriage, actuating mechanism for operating the carriage and feed, and means for returning the rack, after its lateral travel, to its initial position, comprising the carrying-key provided with a lever-arm 46, a projecting piece 53 carried on said arm, the carrying-frame, the latch thereon, lever 90, strap 95, and a spring 98, substantially as described.

17. In an adding-machine, the combination with a carriage, a series of numeral-pinions, and actuating mechanism for reciprocating the carriage and rotating the pinions, a series of carrying pawl-levers arranged in proximity to the pinions, carrying-pawls upon said levers engaging the pinions, a cam mechanism in connection with each pinion, adapted, at certain periods, to throw back the carrying-levers, a reciprocating frame, and a carrying device arranged thereon, adapted, during the reciprocation of said frame, to return the carrying-levers to their initial position.

18. In an adding-machine, the combination with a carriage, a series of numeral-pinions, and actuating mechanism for reciprocating the carriage and rotating the pinions, a series of carrying pawl-levers arranged in proximity to the pinions, carrying-pawls upon said levers engaging the pinions, and cam mechanism in connection with each pinion, adapted, at certain periods, to throw back the carrying-levers, a reciprocating frame, and an inclined face thereon, adapted, during the reciprocation of the frame, to return the carrying-levers to their initial positions.

19. In an adding-machine, the combination with a carriage, a series of numeral-pinions, and actuating mechanism for reciprocating the carriage and rotating the pinions, a series of carrying pawl-levers arranged in proximity to the pinions, carrying-pawls upon said levers engaging the pinions, a cam mechanism in connection with each pinion, adapted, at certain periods, to throw back the carrying-levers, a reciprocating frame, an inclined face thereon, adapted, during the reciprocation of the frame, to operate the pawl-levers, and a shoulder on said frame opposite the inclined face adapted to engage with the pinions, substantially as described.

20. In an adding-machine, the combination with a series of numeral-pinions, a reciprocating carriage for rotating the pinions, a series of carriage-operating keys, and differential stops controlled by the keys for limiting the travel of the carriage.

21. In an adding-machine, the combination with a series of numeral-pinions, a reciprocating carriage, a series of carriage-operating keys, differential stops controlled by the keys for limiting the travel of the carriage, a pinion-actuating device upon said carriage, and a shifting mechanism for moving said pinion-actuating device laterally.

22. In an adding-machine, the combination with a series of operating-keys, of a carriage mounted for reciprocation, intermediate connections between the keys and carriage, whereby the latter is moved forwardly upon the depression of any of the keys, spring-actuated mechanism for automatically returning the carriage to its initial position, a series of numeral-pinions arranged upon a shaft for independent rotation, a rack mounted upon the carriage, a lateral feed for said rack adapted to throw the latter in engagement with one of the pinions before the forward movement of the carriage, and a safety device for preventing said forward movement of the carriage until the rack is in engagement with one of the pinions.

23. In an adding-machine, the combination with a series of operating-keys, of a carriage mounted for reciprocation, intermediate connections between the keys and carriage, whereby the latter is moved forwardly upon the depression of any of the keys, spring-actuated mechanism for automatically returning the carriage to its initial position, a series of numeral-pinions arranged upon a shaft for independent rotation, a rack mounted upon the carriage, and a lateral feed for said rack adapted to throw the latter in engagement with one of the pinions before the forward movement of the carriage, and a safety device for the purpose of preventing the forward movement of said carriage until the rack is in engagement with one of the pinions, said device consisting of the toothed bar 69 swingingly supported from the casing, and located as described.

24. In an adding-machine, the combination with a series of numeral-pinions, a reciprocating carriage for rotating said pinions, and a carrying mechanism for the pinions adapted to rotate such of the latter as are involved in the operation of carrying, comprising a series of pinion-rotating devices, a cam mechanism in connection with each pinion for moving its rotating device outwardly, and a reciprocating frame for returning each rotating device to its initial position.

25. In an adding-machine, the combination with a series of numeral-pinions, operating-keys therefor, and a carrying mechanism comprising devices for rotating said pinions, and means independent of said pinions and actuated by said keys for actuating said devices.

26. In an adding-machine, the combination with a plurality of numeral-pinions mounted for independent rotation in one direction, a series of carrying-levers arranged in proximity to the pinions and having intermediate connections with the latter, an independent automatically-reciprocated frame for operating said carrying-levers and a pinion-operating device for completing, without moving the carrying-levers, the revolutions of all the pinions left partially rotated after the operation of adding has been completed.

In testimony whereof I affix my signature in presence of two witnesses.

ROBERT E. KIMBALL.

Witnesses:
L. J. WHITTEMORE,
CHARLES L. STOCKER.